(12) United States Patent
Guerret et al.

(10) Patent No.: US 8,299,176 B2
(45) Date of Patent: Oct. 30, 2012

(54) THERMOSETTING POLY(THIO)URETHANE FORMULATION COMPRISING AT LEAST ONE BLOCK COPOLYMER AND USE THEREOF IN OPTICS FOR THE PRODUCTION OF ORGANIC LENSES HAVING IMPROVED TOUGHNESS

(75) Inventors: Olivier Guerret, Mazerolles (FR); Boris Jaffrennou, Lyons (FR); Noemie Lesartre, Charenton (FR); Francoise Mechin, Lyons (FR); Jean-Pierre Pascault, Villeurbanne (FR)

(73) Assignee: Essilor International (Compagnie Generale D'Optique), Charenton le Pont (FR)

( * ) Notice: Subject to any disclaimer, the term of this patent is extended or adjusted under 35 U.S.C. 154(b) by 802 days.

(21) Appl. No.: 11/910,175

(22) PCT Filed: Mar. 29, 2006

(86) PCT No.: PCT/FR2006/050272
§ 371 (c)(1),
(2), (4) Date: Sep. 28, 2007

(87) PCT Pub. No.: WO2006/103371
PCT Pub. Date: Oct. 5, 2006

(65) Prior Publication Data
US 2009/0143545 A1    Jun. 4, 2009

(30) Foreign Application Priority Data
Mar. 31, 2005    (FR) ..................................... 05 50847

(51) Int. Cl.
*C08L 75/04*    (2006.01)
*C08L 53/00*    (2006.01)
*G02B 1/04*    (2006.01)

(52) U.S. Cl. ...... 525/88; 525/92 R; 525/92 C; 525/92 F; 525/92 H; 525/92 L; 525/92 J (58) Field of Classification Search ................... 525/88, 525/92 R, 92 C, 92 F, 92 H, 92 J, 92 L, 90, 525/91, 93, 94
See application file for complete search history.

(56) References Cited

U.S. PATENT DOCUMENTS

| | | | | |
|---|---|---|---|---|
| 4,483,894 A * | 11/1984 | Porter et al. | ..... | 428/95 |
| 4,581,408 A * | 4/1986 | Trabert et al. | ..... | 525/66 |
| 6,008,296 A | 12/1999 | Yang et al. | ..... | 525/123 |
| 2003/0138616 A1 * | 7/2003 | Englert | ..... | 428/292.4 |
| 2004/0034124 A1 | 2/2004 | Court et al. | ..... | 532/400 |

FOREIGN PATENT DOCUMENTS

| | | |
|---|---|---|
| EP | 1116735 | 7/2001 |
| EP | 1535964 | 6/2005 |
| WO | WO 2004/005403 | 1/2004 |

* cited by examiner

*Primary Examiner* — Jeffrey Mullis
(74) *Attorney, Agent, or Firm* — Fulbright & Jaworski L.L.P.

(57) ABSTRACT

The invention relates to a polymerisable liquid mixture comprising: (a) a polymerisable thermosetting composition which is a precursor by polymerization of a first thermoset polymer material, said composition containing at least one polythiol and/or one polyol, preferably a polythiol, and at least one polyiso(thio)cyanate; and (b) a second polymer material solubilized in the aforementioned polymerisable thermosetting composition, whereby the second material (i) contains at least one block copolymer comprising at least two polymer blocks A and B, namely an elastomer block A and a hydrophilic block B, and, following polymerization of the polymerisable mixture, (ii) forms domains which are rich in elastomer block A and which are dispersed throughout the first material, said domains being smaller than 80 nanometers and preferably smaller than 50 nanometers. The invention also relates to a transparent article having improved toughness, which is produced by means of polymerization of the above-mentioned polymerisable mixture, comprising an alloy of a first thermoset polymer material forming the matrix of said article and of a second polymer material which is dispersed throughout said first material. The aforementioned articles have improved resistance to impact and to crack propagation. The invention is suitable for use in ophthalmic optics.

26 Claims, 1 Drawing Sheet

Formulation A / 5 % PMMA

Formulation A / 5 % poly(MMA-co-DMA) with 7.5 % mol. of DMA

Formulation A / 5 % poly((MMA-co-DMA) with 15 % mol. of DMA

Formulation A / 5 % poly(MMA-co-DMA) with 25 % mol. of DMA

Experiment 1

Experiment 2

Experiment 3

Experiment 4

Example 1

Example 2

THERMOSETTING POLY(THIO)URETHANE FORMULATION COMPRISING AT LEAST ONE BLOCK COPOLYMER AND USE THEREOF IN OPTICS FOR THE PRODUCTION OF ORGANIC LENSES HAVING IMPROVED TOUGHNESS

The present invention relates in general to a polymerizable mixture comprising a thermosetting poly(thio)urethane formulation and at least one block copolymer, transparent molded articles having an improved toughness, especially optical articles, comprising a poly(thio)urethane glass substrate obtained by polymerizing the hereabove mixture, and a method for producing such articles. These articles, due to their improved toughness, have a better impact and crack propagation resistance. The invention relates more particularly to the field of ophthalmic lenses.

There are two types of substrates typically used for producing optical articles such as ophthalmic lenses: mineral glass substrates and organic glass substrates. Nowadays, the market tends to markedly develop in favour of organic glasses that have two main advantages as compared to mineral glasses: their good impact resistance and their lightness. The organic glass substrates that are the most employed are those made of bisphenol A polycarbonate and those obtained by polymerizing diethylene glycol bis(allyl carbonate) monomer, marketed especially under the trade name CR 39® by PPG INDUSTRIES. Such a lens is marketed under the trade name Orma® by Essilor. Other linear or branched, aliphatic or aromatic polyol ally carbonates may be used. Suitable are also organic glasses obtained by polymerizing thio(meth)acrylic monomers, such as those described in the French patent application FR 2 734 827, those having thiourethane formulations such as described in the applications WO 00/26272 and EP 0645647, C1-C4 alkyl(meth)acrylate monomers, such as methyl methacrylate, polyethoxylated aromatic poly(meth)acrylate monomers such as ethoxylated bisphenol A di(meth)acrylates, especially 2,2-bis[4-(methacryloxy-diethoxy)-phenyl]propane. As used herein, the (meth)acrylate group represents a methacrylate or an acrylate group. Thermosetting resins of polythiourethane type are particularly interesting as they make it possible to reach high refractive indices, generally ranging from 1.6 to 1.74, preferably from $n_e=1.67$ to $n_e=1.74$, indicating that the glasses are thinner and flatter. These performances result from the incorporation of heavy atoms such as sulfur atoms, or of aromatic groups into the polymer chains.

Spectacle frames that are said to be "drilled" or "rimless", that is to say that do not have any circular frame surrounding the periphery of the ophthalmic lenses, are very successful nowadays. To fix the temple portions onto these new frames, drilling of the glass is performed by machining. A fastening means is then introduced into the bore and the temple portions are assembled integral with this fastening means. In the drilled area, the glass undergoes stresses especially when using the frame under normal conditions, especially when opening and closing the temple portions. However, it has been observed that the cracks that could be seen with the naked eye may propagate from the hole periphery on a distance of several millimeters when using some known ophthalmic lens organic substrates. Improving the impact resistance and crack propagation resistance properties of the commercially available, high refractive index poly(thio)urethane glass substrates hence represents an objective the manufacturers try to aimed at.

A polymer alloy represents a mixture of at least two polymers which chemical nature does differ (thus including copolymers), whatever the number of phases it may contain. There are three main classes of polymer alloys: (1) alloys consisting in a thermosetting component and a thermosetting component; (2) alloys consisting in a thermoplastic component (and/or an elastomer component) and a thermoplastic component (and/or an elastomer component); (3) alloys consisting in a thermoplastic component (and/or an elastomer component) and a thermosetting component. Class (1) does encompass the range of said interpenetrating networks (IPN). Class (2) is the most studied in the literature. Generally speaking, two thermoplastic materials are not miscible. They may be made compatible by means of block copolymers, especially of the diblock type. Reducing the interfacial stress and improving the interfacial adherence enable for the production of finer morphologies and do especially promote the stress transfer mechanism between phases, thus improving the mechanical properties. Class (3) does encompass materials having modulable properties, especially optical and mechanical properties since they may combine the advantages of the thermoset phase, such as for example the solvent resistance or a high refractive index, with those of the thermoplastic polymer (and/or elastomer), for example the impact resistance. This third type of alloy may also advantageously facilitate the implementation of the employed materials, for example when liquid monomers in the thermosetting polymerizable composition are used as reactive solvents for the thermoplastic material.

However, the range of transparent polymer alloys is limited, especially in the case of thermoplastic or thermoset type alloys. Generally speaking, two conditions must be met to obtain such a property for an alloy consisting in a thermoset phase derived from a liquid thermosetting polymerizable composition and a second material: (a) the second material must have a good miscibility with the thermosetting polymerizable composition, so as to be able to be solubilized therein relatively easily; (b) a demixing, that is to say a phase macroseparation between the developing matrix and the phase consisting in the second material must be avoided during the polymerization of the thermosetting material.

To simplify, the miscibility state of any mixture depends on the free energy in the mixture, $\Delta G_m$:

$$\Delta G_m = \Delta H_m - T\Delta S_m$$

wherein $\Delta H_m$ represents the mixture enthalpy and $\Delta S_m$ the mixture entropy.

The necessary (but not sufficient) condition for a mixture to be miscible is that $\Delta G_m$ be negative. Where $\Delta G_m$ is positive, the mixture separates into two phases. With reactive mixtures, the phase diagram varies as the reaction does proceed, thus defining at any time/at any conversion a new thermodynamical equilibrium. The increase in the molecular weight of species in the developing matrix leads to a decrease in the mixture entropy $\Delta S_m$ and thus to an increase in $\Delta G_m$ which may express as a phase macroseparation, that is to say through expelling of the phase comprising the second material. Where the refraction indices of the thermoset phase and of the phase comprising the second material are different, this phase macroseparation results in a scattering material. The article comprising the polymer alloy is given a milky appearance.

Where said article is the substrate in organic glass of an ophthalmic lens, scattering affects the vision quality for the wearer.

There are two main polymer additive families traditionally used for reinforcing thermosetting systems: those additives said to be "initially miscible" and the pre-formed particles of the core-shell type. However, for a couple of years, the use of block copolymers as thermoplastic additives for improving the mechanical properties of thermosetting networks is growing.

The first thermosetting system reinforcement concept, which is also the most frequently employed, does rely on the mode said to be initially miscible, according to which the additive is dissolved in the thermosetting system precursors. Because of the increase in the molecular weight of the system being polymerized, a phase separation phenomenon occurs, that results in a dual phase final system, comprising an additive-rich phase and a thermosetting-rich phase. For minor additive amounts, the final thermosetting structure thus contains dispersed additive inclusions. These additives may be of two types, i.e. either be elastomers, or thermoplastic materials having a high glass transition temperature. The most known elastomers include butadiene and acrylonitrile random copolymers functionalized at the end of the chain. They may be amine-terminated (ATBN: Levita, G.; Marchetti, A.; Butta, E. *Polymer* 1985, 26, 1110-1116), carboxyl (CTBN: Manzione, L. T.; Gillham, J. K. *J. Appl. Polym. Sci.* 1981, 26, 907-919) or epoxy-terminated (ETBN: Verchère, D.; Sautereau, H.; Pascault, J. P. *J. Appl. Polym. Sci.* 1990, 41, 467-485). Advantageously, the elastomers, due to their low viscosity, do not modify the system processability. The post-reaction morphology is of the dual phase type, formed with small elastomer particles (ranging from 0.1 to 1 μm) dispersed and attached to the network. However, elastomers suffer from a critical limitation as regards thermosetting reinforcement: during the phase separation, a fraction of additive may remain dissolved in the thermosetting component-rich phase. The glass transition temperature of the plasticized network therefore is decreased, which is not desirable since good thermomechanical properties ($T_g \geq 70°$ C., preferably $\geq 80°$ C., and more preferably $\geq 90°$ C.) are expected. In addition, the concept relies on a phase macroseparation phenomenon that occurs during the reaction, thus providing opaque final materials, which is not very interesting in the optics field. To counteract the drawbacks of the elastomers, high glass transition temperature (Tg) thermoplastics, such as poly(ether-imides) (PEI: Hourston, D. J.; Lane, J. M.; Zhang, H. X. *Polym. Int.* 1997, 42, 349-355) or poly(ether-sulfones) (PES: Raghava, R. S. *J. Polym. Sci. B: Polym. Phys.* 1987, 25, 1017-1031) are used to produce systems based on rigid and ductile particles dispersed in the matrix. In that case, there isn't any glass transition temperature reduction. However, for a minor thermoplastic concentration, the presence of PEI or PES nodules does not modify the breaking strength of the thermosetting matrices very much. With higher thermoplastic concentrations, on the contrary, the bicontinuous morphology obtained enables for a significant improvement in the crack propagation resistance. As previously mentioned, the concept relies on a phase macroseparation during polymerization, thus producing opaque final materials. A second concept for reinforcing thermosetting systems consists in dispersing pre-formed particles of the core-shell type in the matrix, the core being formed with a graftable elastomer that is cross-linked or insoluble in the thermosetting precursor monomers, the shell grafted onto the core being used to stabilize the particle in the thermosetting resin. The size control only depends on the initial particle size selection. According to this concept, the epoxy network reinforcement by means of butyl poly(acrylate) core particles/poly(methyl methacrylate) shell particles noted PBA/PMMA was described in the article of Ashida, T.; Katoh, A.; Handa, K.; Ochi, M. *J. Appl. Polym. Sci.* 1999, 14, 2955-2962. Nevertheless, the size of the pre-formed particles that do provide a satisfying impact reinforcement is too high to enable for the production of a transparent material. The crack propagation resistance properties of thermosetting matrices may hence be improved by using either of these concepts. However, in both cases, the obtained matrices are not transparent, which is a crucially required property in the optics field.

As regards the third impact reinforcement concept for thermosetting matrices, that relies on the introduction into these matrices of block copolymers, only a few recent examples are described in the literature. Introducing a poly(caprolactone)-block-poly(dimethyl-siloxane)-block-poly(caprolactone) triblock copolymer, noted PCL-b-PDMS-b-PCL, into the epoxy matrices results in the formation of particles having a diameter of about 20 nm, that are homogeneously distributed within the matrix. The final material is transparent and the reinforcement is higher than 100% for a mixture comprising 5% by weight of copolymer, a description of which can be found in "Ultimate properties of epoxy resins modified with a polysiloxane-polycaprolactone block copolymer", Könczöl, L.; Döll, W.; Buchholz, U.; Mülhaupt, R. *J. Appl. Polym. Sci.* 1994, 54, 815-826. In matrices of the same type, introducing copolymers comprising poly(oxytetramethylene) flexible blocks and poly(hexamethylene terephthalate) rigid blocks also makes it possible to improve the mechanical properties of the matrix according to the article "Toughening of epoxy resins modified with polyether ester block copolymers: the influence of modifier molecular architecture on mechanical properties", Höfflin, F., Könczöl, L.; Döll, W.; Morawiec, J.; Mülhaupt, R. *J. Appl. Polym. Sci.* 2000, 76, 623-634.

Finally, adding triblock copolymers of the styrene-(1,4-butadiene)-methyl methacrylate type (SBM copolymers of ABC type) made by Arkema (formerly Atofina) in thermosetting epoxy matrices gave rise to recent studies and to spectacular results as for the mechanical property improvement for materials that moreover remain transparent and only undergo a minor decrease in the modulus of elasticity. These works are described in "ABC Triblock Copolymers/Epoxy-Diamine Blends. 1. Keys to achieve Nano-structured Thermosets", Ritzenthaler, S.; Court, F.; David, L.; Girard-Reydet, E.; Leibler, L.; Pascault, J. P. *Macromolecules* 2002, 35, 6245-6254, "ABC Triblock Copolymers/Epoxy-Diamine Blends. 2. Parameters controlling the Morphologies and Properties", Ritzenthaler, S.; Court, F.; Girard-Reydet, E.; Leibler, L.; Pascault, J. P. *Macromolecules* 2003, 36, 118-126, "A new class of Epoxy Thermosets", Girard-Reydet, E.; Pascault, J. P.; Bonnet, A.; Court, F.; Leibler, L. *Macromol. Symp.* 2003, 198, 309-322, and in the European patent application EP1,290,088, that more particularly describes the block copolymers.

The third concept of impact reinforcement for thermosetting matrices by introducing block copolymers into these matrices was only described for epoxy type matrices. But it had been previously said that it would be desirable to have new polymerizable poly(thio)urethane formulations available, so as to obtain new transparent substrates for high refractive index optical articles, that would combine impact resistance and crack propagation resistance properties, especially to be adapted to "drilled spectacles". The solution consisting in introducing into the poly(thio)urethane formulations block copolymers of the SBM type such as those described in the European patent EP1,290,088 is not satisfactory. The present inventors discovered that it would lead to a phase macroseparation and to a production of fully opaque final materials. As an explanation, this result would be due to the fact that the methyl methacrylate block, which acts as the "compatible" block (miscible from the beginning to the end of the reaction), thus enabling for the triblock nanostructuration in epoxy formulations, does not play such a role in the poly(thio)urethane formulations.

It is therefore an object of the present invention to provide a polymerizable mixture comprising a thermosetting poly (thio)urethane formulation, precursor of a first material, wherein a second material is solubilized, that comprises one (or more) block copolymer(s) able to give an improved toughness to the future matrix that contains the first material, without depriving it from its transparency. The toughness is measured using the stress intensity critical factor $K_{Ic}$, which has a positive influence on the impact resistance and the crack propagation limitation. The defined block copolymer range makes it possible to nanostructure the poly(thio)urethane matrices without causing any glass transition temperature (Tg) decrease, which would lead to a decrease in the storage modulus E' at 100° C.

It is another object of the present invention to provide a transparent article, especially an optical article such as an ophthalmic lens, resulting from the polymerization of the previous polymerizable mixture, containing a polymer alloy comprising the first thermoset polymer material and the second polymer material modifying its mechanical properties and/or optical properties, while avoiding a phase macroseparation, so that the molded article obtained is transparent. It is finally a further object of the invention to provide a method for making such articles.

The suitable block copolymer selection makes it possible to counterbalance the drawbacks of the polymerizable mixtures of the prior art. The applicants found that thanks to specific block copolymers an elastomer phase could be generated in situ that would be sufficiently small so as not to interfere with the transparency or to decrease the E' modulus of the material at 100° C.

The objectives that are described hereabove are aimed at with a liquid polymerizable mixture comprising (a) a thermosetting polymerizable composition, which is the precursor, by polymerization, of a first thermoset polymer material, said composition comprising at least one polythiol and/or at least one polyol, preferably at least one polythiol, and at least one polyiso(thio)cyanate, (b) a second polymer material solubilized in said thermosetting polymerizable composition, said second material:
  comprising at least one block copolymer comprising at least two polymer blocks A and B, said block A being an elastomer block and said block B being a hydrophilic block.
  and forming, after polymerization of the polymerizable mixture, elastomer block A-rich areas dispersed within the first material, said area sizes being of less than 80 nanometers, preferably of less than 50 nanometers.

Preferably, in the previously mentioned polymerizable mixture, the block B is able to absorb an amount of water of at least 2% of its weight, and preferably an amount of water of 3 to 15% of its weight.

The block B may be made hydrophilic by preparing it from water-soluble monomer(s), that is to say the block B is a block homopolymer formed from a water-soluble monomer or a block copolymer comprising at least one water-soluble monomer unit.

It may also be obtained by treating a non hydrophilic block homopolymer or copolymer already formed, for example by converting functional groups that already exist in the block homopolymer or copolymer into hydrophilic groups. Such a method is described for example in the article "Enhanced Förster resonance energy transfer in electrostatically self-assembled multilayer films made from new fluorescently labeled polycations", Jean-François Baussard, Jean-Louis Habib-Jiwan, André Laschewsky Langmuir 2003, 19, 7963-7969.

In the remaining of the application, the preparation method starting from water-soluble monomers will be more particularly described, which is the most preferred embodiment.

The polymerizable mixture of the invention does provide, after polymerization, a transparent article having an improved toughness, comprising an alloy of the first thermoset polymer material that forms the matrix of said article, and of the second polymer material dispersed within said first material. While the present disclosure essentially relates to the particular simple case of block copolymers comprising two categories of polymer blocks, A and B, it should be noted herein that the present polymerizable mixture of the invention isn't in any way limited to this type of block copolymers. Said polymerizable mixture may comprise any block copolymer comprising at least two blocks A and B, especially block copolymers comprising more than two categories of blocks, for example triblocks of the BAB, ABC, BAC or ACB type, on the condition that the polymer blocks A and B and the material resulting from the polymerization of the polymerizable mixture of the invention have the defined characteristics.

The polymerizable mixture of the invention is liquid or may be made liquid, optionally by heating, under the conditions of its polymerization reaction. It comprises a thermosetting polymerizable composition, that is preferably also liquid under these conditions. As used herein, "liquid" does refer to the state of the matter in which this one presents a sufficient mobility to be able to flow under the influence of gravity, but not sufficient to be able to move free within the space. The thermosetting polymerizable composition represents preferably from 50 to 99% by weight of the polymerizable mixture of the invention, preferably from 70 to 95%. Upon polymerizing (or copolymerizing), this composition results in a first thermoset polymer material, of the poly(thio)urethane type. A polythiourethane is a reaction product of an isocyanate with a thiol. The first thermoset material may comprise one or more cross-linked (co)polymer(s), preferably only one cross-linked (co)polymer. The thermosetting polymerizable composition comprises at least one polythiol and/or at least one polyol, preferably at least one polythiol, and at least one polyiso(thio)cyanate. As used herein, a "polythiol" does refer to any compound having in its structure at least two thiol groups, such as di-, tri-, tetra-, penta- or hexathiol compounds. It thus may relate to an optionally telechelic polymer or prepolymer, carrying at least two thiol groups. The one or more polythiol(s) may have following formula (I):

$$R^1(SH)_{n1} \qquad (I)$$

wherein n1 represents an integer ranging from 2 to 6, being preferably 2 or 3, and $R^1$ represents an aliphatic, alicyclic, heterocyclic or aromatic radical, the valence of which is n1. $R^1$ may comprise groups carrying a labile hydrogen atom, such as primary amine, secondary amine and hydroxyl groups. $R^1$ may also comprise one or more heteroatom(s) in its carbon chain, for example sulfur, oxygen, selenium or nitrogen atoms. If $R^1$ includes in its structure a heterocyclic or an aromatic group, the latter may be substituted with one or more halogen atom(s) such as Cl or Br. Preferably, the polythiol compound is a polythiol monomer and it comprises two or three thiol groups. Examples of suitable polythiols that may be used in the present invention are mentioned in the EP 394495, U.S. Pat. No. 4,775,733, U.S. Pat. No. 4,609,762 and U.S. Pat. No. 5,225,472. Polythiols may be selected, without limitation, in the group consisting of pentaerythritol tetrakis (3-mercaptopropionate), 1-(1'-mercaptoethylthio)-2,3-dimercaptopropane, 1-(2'-mercaptopropylthio)-2-(2'-mercaptopropylthio)-2,3-dimercapto-propane, 1-(3'-mercaptopropylthio)-2,3-dimercaptopropane, 1-(4'-mercaptobutylthio)-2,3-dimercaptopropane, 1-(5'-mercaptopentylthio)-2,3-dimercaptopropane, 1-(6'-mercaptohexylthio)-2-(6'-mercaptohexylthio)-2,3-dimercapto-propane, 1,2-bis(4'-mercaptobutylthio)-3-mercaptopropane, 1,2-bis (5'-mercaptopentylthio)-3-mercaptopropane, 1,2-bis(6'-mercaptohexyl)-3-mercaptopropane, 1,2,3-tris(mercaptomethylthio)propane, 1,2,3-tris(3'-mercaptopropylthio)propane, 1,2,3-tris(2'-mercaptoethylthio)propane, 1,2,3-tris(4'-mercaptobutylthio)propane, 1,2,3-tris(6'-mercapto-hexylthio)propane, methane dithiol, 1,2-ethane dithiol, 1,3-propane dithiol, 1,4-butane dithiol, 1,5-pentane dithiol, 1,6-hexane dithiol, 1,7-heptane dithiol, 1,8-octane dithiol, 1,9-nonane dithiol, 1,10-decane dithiol, 1,11-undecane dithiol, 1,12-dodecane dithiol, 1,1-propane dithiol, 1,2-propane dithiol, 2,2-propane dithiol, 1,2-bis(2'-mercaptoethylthio)-3-mercaptopropane (or 4-mercaptomethyl-3,6-dithia-1,8-octane dithiol, or MDO), of formula (II), 1,2-butane dithiol, 2,3-butane dithiol, 2,2-butane dithiol, 1,2-hexane dithiol, 2,5-hexane dithiol, 2,6-heptane dithiol, 2,4-pentane dithiol, 3,3-pentane dithiol, 7,8-heptadecane dithiol, 9,10-anthracene dimethanethiol, 4-ethyl-benzene-1,3-dithiol, 1,18-octadecane dithiol, 1,3-(4-chlorophenyl)propane-2,2-dithiol, 1,1-cyclohexane dithiol, 1,2-cyclohexane dithiol, 1,4-cyclohexane dithiol, 1,1-cycloheptane dithiol, 1,1-cyclopentane dithiol, dithiopentaerythritol, 1,4-dithiothreitol, 1,3-diphenyl propane-2,2-dithiol, 1,3-dihydroxy-2-propyl-2',3'-dimercaptopropyl-ether, 2,3-dihydroxypropyl-2',3'-dimercaptopropyl-ether, 2,6-dimethyloctane-2,6-dithiol, 2,6-dimethyloctane-3,7-dithiol, 2,4-dimethylbenzene-1,3-dithiol, 3,3-dimethylbutane-2,2-dithiol, 1,3-di(4-methoxyphenyl)-propane-2,2-dithiol, 10,11-dimercaptoundecanoic acid, 6,8-dimercapto-octanoic acid, 2,5-dimercapto-1,3,4-thiadiazole, 2,2'-dimercapto-biphenyl, 4,4-dimercaptobiphenyl, 4,4'-dimercaptobibenzyl, 3,4-dimercaptobutanol, 3,4-dimercaptobutyl acetate, 2,3-dimercapto-propan-1-ol, 1,2-dimercapto-1,3-butane diol, 2,3-dimercaptopropionic acid, 1,2-dimercaptopropyl methyl ether, 3,4-thiophene dithiol, dimercaptopropyl-2',3'-dimethoxypropylether, 3,5,5-trimethyhexane-1,1-dithiol, 2,5-toluene dithiol, 3,4-toluene dithiol, 1,4-naphtalene dithiol, 1,5-naphtalene dithiol, 2,6-naphtalene dithiol, norbornene-2,3-dithiol, bis(2-mercaptoisopropyl)ether, bis(11-mercapto-undecyl)sulfide, bis(2-mercaptoethyl)ether, bis(2-mercaptoethyl)sulfide, bis(18-mercapto-octadecyl) sulfide, bis(8-mercapto-octyl)sulfide, bis(12-mercaptodecyl)sulfide, bis(9-mercaptononyl)sulfide, bis(4-mercaptobutyl)sulfide, bis(3-mercaptopropyl)ether, bis(3-mercaptopropyl)sulfide, bis(6-mercaptohexyl)sulfide, bis(7-mercaptoheptyl)sulfide, bis(5-mercaptopentyl)sulfide, 2,2'-bis (mercaptomethyl)acetic acid, 1,1-bis(mercaptomethyl)cyclohexane, bis (mercaptomethyl)durene, phenylmethane-1,1-dithiol, 1,2-benzene dithiol, 1,3-benzene dithiol, 1,4-benzene dithiol, 2-methylcyclohexane-1,1-dithiol, 2-methylbutane-2,3-dithiol, ethylene glycol dithioglycolate, ethylene glycol bis(3-mercaptopropionate), 1,2,3-propanetrithiol, 1,2,4-butanetrithiol, 1,3,6-hexane trithiol, trimethylolpropane tris(thioglycolate), trimethylolpropane tris(3-mercaptopropionate), trimethylolpropane tris(mercaptoacetate), pentaerythritol tris(thioglycolate), pentaerythritol tris(3-mercaptopropionate), 1,3,5-benzenetrithiol, 2,4,6-mesitylene trithiol, neopentane tetrathiol, 2,2-bis(mercaptomethyl)-1,3-propane dithiol, 1,3,5-benzenetrithiol, 2,4,6-toluenetrithiol, 2,4,6-methylene trithiol, pentaerythritol tetrakis(thioglycolate), pentaerythritol tetrakis(mercaptoacetate), trimethylolethane tris(mercaptopropionate), trimethylolethane tris(mercaptoacetate), dichloroneopentyl glycol bis(mercaptopropionate), dibromoneopentyl glycol bis(mercaptopropionate), dipentaerythritol hexakis(mercaptoacetate), dimercaptomethyl dithiane, dimercapto-3-oxapentane, dimercaptodioxaoctane, 2-butene-1,4-dithiol, 3-hexyne-1,6-dithiol, polyethylene glycol dithiols and polythiols corresponding to formulae (III) to (V) and (Va):

Preferably, the polythiol(s) is or are selected from pentaerythritol tris(3-mercaptopropionate), pentaerythritol tetrakis(thioglycolate), trimethylolpropane tris(3-mercaptopropionate), trimethylolpropane tris(mercaptoacetate) and compounds of formulas (II) and (Va). The preferred polythiol to be used in the invention is 1,2-bis(2'-mercaptoethylthio)-3-mercaptopropane (MDO), of formula (II).

Polythiol prepolymers may also be used, but monomers are preferred.

The thermosetting polymerizable composition comprises in addition to at least one polythiol, and/or at least one polyol, preferably at least one polythiol, at least one polyiso(thio)cyanate, preferably at least one polyisocyanate. As used herein, a "polyiso(thio)cyanate" does refer to any compound including in its structure at least two isothiocyanate groups, or at least two isocyanate groups, or at least one isothiocyanate group and at least one isocyanate group. The polyiso(thio)cyanate may thus be an optionally telechelic polymer or pre-polymer, that does satisfy to the hereabove definition. The polyiso(thio)cyanate(s) may be represented by formula (VI):

wherein X represents an oxygen or a sulfur atom, n2 represents an integer ranging from 2 to 6 and $R^2$ represents an aliphatic, alicyclic, heterocyclic or aromatic radical, the valence of which corresponds to n2. $R^2$ may comprise groups carrying a labile hydrogen atom, such as primary amine, secondary amine and hydroxyl groups. $R^2$ may also comprise one or more heteroatom(s) in its carbon chain, for example sulfur, oxygen, selenium or nitrogen atoms. If $R^2$ includes a heterocyclic or an aromatic group in its structure, the latter may be substituted with one or more halogen atom(s) such as Cl or Br. Preferably, the polyiso(thio)cyanate is a polyiso(thio)cyanate monomer and it comprises two or three iso(thio)cyanate groups. The preferred polyiso(thio)cyanates may be selected, without limitation, in the group consisting of tolylene diiso(thio)cyanates, especially the 2,4- and 2,6-isomers, phenylene diiso(thio)cyanates, especially the meta isomer, ethyl phenylene diiso(thio)cyanates, isopropyl phenylene diiso(thio)cyanates, xylylene diiso(thio)cyanates, especially meta- and para-isomers, diethyl phenylene diiso(thio)cyanates, diisopropyl phenylene diiso(thio)cyanates, naphtalene diiso(thio)cyanates, especially the 1,5-isomer, hexamethylene diiso(thio)cyanate, bis(iso(thio)cyanatomethyl)-cyclohexanes, tris (iso(thio)cyanatomethyl)-cyclohexanes, trimethylbenzene triiso(thio)cyanates, especially mesitylene triiso(thio)cyanates, triiso(thio)cyanato-benzenes, especially the 1,2,4-isomer, (diiso(thio)cyanato-diphenyl)-methanes, especially the 4,4'-isomers (compounds of formula (VII) wherein Z=$CH_2$ and n1=1), tetramethylene diiso(thio)cyanate, cyclohexane-diiso(thio)cyanates, especially the 1,4-isomer, 1,2-diiso(thio)cyanatopropane, 1,3-diiso(thio)cyanatopropane, ethylene diiso(thio)cyanate, hexahydrotolylene diiso(thio)cyanates, 1-methoxyphenyl-2,4-diiso(thio)cyanate, biphenylene diiso(thio)cyanates, especially the 2,2'-, 2,4'- and 4,4'-isomers, 3,3'-dimethoxy-4,4'-biphenyl diiso(thio)cyanate, 3,3'-dimethyl-diphenylmethane-4,4'-diiso(thio)cyanate, tetramethyl xylylene diiso(thio)cyanates, especially m-phenylene diiso-propylidene diisocyanate (m-TMXDI) and p-phenylene diiso-propylidene diisocyanate (p-TMXDI), bis(iso(thio)cyanatomethyl)bicycloheptanes, lysine ester triiso(thio)cyanate, triphenylmethane triiso(thio)cyanates, bicycloheptane triiso(thio)cyanates, hexamethylene triisocyanates, (diiso(thio)cyanato-dicyclohexyl)-methanes, especially the 4,4'-isomers (compounds of formula (VIII) wherein Z=$CH_2$ and n1=1), and the 2,2'- and 2,4'-isomers, compounds of formulae (VII), (VIII), (IX), (X) and compounds of formula (XI), especially isophorone diiso(thio)cyanate (compound of formula (XI) wherein X=O and $R^1=R^2=R^6=CH_3$):

wherein n1 is 0 or 1, n2 is an integer ranging from 2 to 4, n3 is an integer ranging from 1 to 4, the sum: n2+n3≦6, n4 is an integer ranging from 1 to 10, preferably from 1 to 6, X represents O or S, preferably O, Z represents O, S, Se, NH, C=O, SO, $SO_2$, $SeO_2$, $CH_2$, —CH=CH— or —C(R)$_2$— with R representing a hydrogen atom or an $C_1$-$C_6$ alkyl radical, preferably $CH_3$ or $C_2H_5$, $R^1$, $R^2$, $R^4$, $R^5$, $R^6$ independently from each other represent a hydrogen atom or a $C_1$-$C_6$ alkyl radical, preferably $CH_3$ or $C_2H_5$, $R^3$ represents a hydrogen atom, a halogen atom, preferably Cl or Br, or a $C_1$-$C_6$ alkyl radical, preferably $CH_3$ or $C_2H_5$. Preferably, $R^1$ and $R^2$ are the same, $R^4$ and $R^5$ are the same. Preferred polyiso(thio)cyanates to be used in the invention are xylylene diisocyanates.

It should be noted that the polyiso(thio)cyanate may be used in the form of a derivative thereof, for example as its cyclic trimer iso(thio)cyanurate[1,3,5-triazine-2,4,6-(1H,3H,5H)-tri(thi)one], in the form of an allophanate derivative (resulting from a reaction with an urethane compound), in the form of a biuret derivative (resulting from a reaction with an urea) or in the form of an addition product with a polythiol of the polyiso(thio)cyanate itself or as a iso(thio)cyanurate, allophanate or biuret derivative thereof.

Generally, polythiols and polyiso(thio)cyanates are used in such amounts that the molar ratio of the iso(thio)cyanate groups to the thiol groups does vary from 0.8 to 1.2. Any polythiol/polyiso(thio)cyanate combination that would result after polymerization in a transparent thermoset polymer material may be suitably used in the present invention.

The thermosetting polymerizable composition of the invention may comprise one or more polymerization catalyst(s) to accelerate curing, that are well known from the man skilled in the art and will be present in usual amounts. Traditionally, tin-based catalysts such as dibutyl tin dilaurate could be used.

Salts might also be used, such as those described in the international application WO 00/26272. They may be used alone or in admixture with other curing modification agents such as, for example, polymerization inhibitors, in usual amounts. Electron-donor compounds such as those described in the international application WO 00/26272 may also be used, especially when the thermosetting polymerizable composition comprises poorly reactive thiols and/or iso(thio)cyanates. Generally, electron-donor compounds do stabilize the cation of the catalyst salts. They thus contribute to dissociate the anion/cation ion pair and thus do increase the anion reactivity in the polymerizing medium, and therefore do promote the polymerization reaction. Electron-donor compounds are preferably selected from acetonitrile derivatives such as malononitriles, amides, amines, imines, phosphines, sulfones, sulfoxides, trialkyl phosphites, triaryl phosphites, ethylene glycol ethers, crown ethers and cryptands. They preferably represent from 0 to 5%, more preferably from 0 to 1% by weight, as compared to the polymerizable mixture total weight. Preferred electron-donor compounds are crown ethers, cryptands, trialkyl phosphites, triaryl phosphites and malononitriles.

The thermosetting polymerizable composition of the invention may also comprise some other additives traditionally used in polymerizable compositions for optical articles, especially for molded articles, more particularly ophthalmic lenses, in usual amounts. Examples of additives are, without limitation, colouring agents, photochromic agents, stabilizers such as UV absorbers, antioxidants and anti-yellowing agents, fragrances, deodorants, mold-release agents, lubricants, adhesion promoters and coupling agents.

Suitable UV absorbers (UV radiation-filtering systems) that can be used according to the invention in the thermosetting polymerizable composition include, without limitation, 4-aminobenzoic acid (PABA) and salts thereof, anthranilic acid and salts thereof, salicylic acid and salts or esters thereof, especially aryl hydroxy benzoates, 4-hydroxycinnamic acid and salts thereof, benzoxazole sulfonic derivatives, benzimidazoles and benzothiazoles and salts thereof, benzophenones, especially benzophenone sulfonic derivatives and 2-hydroxybenzophenones and salts thereof, camphor benzylidene sulfonic derivatives and salts thereof, camphor benzylidene derivatives substituted with a quaternary ammonium group and salts thereof, camphor sulfonic acid phthalylidene derivatives and salts thereof, benzotriazoles, especially benzotriazole sulfonic derivatives and salts thereof, oxalamides, oxanilides, and mixtures thereof.

Non limitative examples of UV absorbers that may suitably be used in the present invention include 2-(2-hydroxyphenyl)-2H-benzotriazole, PBSA (sodium salt of 2-phenyl-benzimidazole-5-sulfonic acid, marketed under the trade name PARSOL® HS by Givaudan-Roure), 4-tert-butyl-4'-methoxy-dibenzoylmethane (marketed under the trade name PARSOL® 1789 by Givaudan-Roure), 2-ethylhexyl p-methoxycinnamate or avobenzone (marketed under the trade name PARSOL® MCX by Givaudan-Roure), octyl p-methoxycinnamate, UVINUL® MS 40 (2-hydroxy-4-methoxybenzophenone-5-sulfonic acid, BASF), UVINUL® M 40 (2-hydroxy-4-methoxybenzophenone, BASF), octocrylene (2-ethylhexyl 2-cyano-3,3-diphenyl acrylate), 2-ethylhexyl 4-dimethylaminobenzoate (octyl dimethyl-PABA), triethanolamine salicylate, octyl salicylate. It is also possible to use polymers having anti-UV properties, especially polymers comprising benzylidene camphor groups and/or benzotriazole groups, substituted with sulfonic or quaternary ammonium groups. They may be used alone or in admixture with other UV absorbers.

Anti-yellowing agents such as 3-methyl-but-2-en-1-ol (M-BOL) and those described in the U.S. Pat. No. 5,442,022, U.S. Pat. No. 5,445,828, U.S. Pat. No. 5,702,825, U.S. Pat. No. 5,741,831 and FR 2,699,541 may be used, without limitation, alone or in admixture.

Although the thermosetting polymerizable composition of the invention preferably does not comprise any solvent, it may nevertheless comprise one solvent or a mixture of solvents in a small amount. A solvent may facilitate the salt dissolution in said composition, for example of catalysts coming as salts. Generally, the solvent mixture concentration represents from 0 to 2% by weight of the thermosetting polymerizable composition of the invention, preferably from 0 to 0.5%. A polar solvent such as acetonitrile, tetrahydrofurane or dioxane may be used. However, to avoid any bubble or turbidity formation during polymerization, it is preferred to use a solvent that is reactive against thiols or iso(thio)cyanates. Solvents carrying a hydroxyl group are preferred. Amongst them, hydroxylated solvents bearing in addition a double bond able to react with a thiol and/or bearing another function having a labile hydrogen (for example NH, SH OH) able to react with an iso(thio)cyanate are the most interesting. Suitable solvents include methanol, ethanol, propanol, acetone, acetonitrile and 3-methyl-but-2-en-1-ol, that may also be used as an anti-yellowing agent.

The polymerizable mixture of the invention comprises a second polymer material that is solubilized in the thermosetting polymerizable composition as previously defined. This requires for the second material to be initially soluble in said thermosetting polymerizable composition, optionally under heating. It is preferably soluble at a temperature below 135° C. This second material comprises at least one block copolymer comprising at least two polymer blocks A and B. It simultaneously presents all properties from both types of block. In the present invention, type A blocks and type B blocks are two categories of blocks having different technical characteristics. They will thereafter traditionally be called "blocks A" and "blocks B", and may themselves comprise several blocks. A and B may be random copolymers.

The composition of the polymerizable mixture of the invention makes it possible to avoid a phase macroseparation during the curing of the thermosetting polymerizable composition. The block copolymers of the invention are able to nanostructure the poly(thio)urethane thermosetting matrices as previously defined, by creating in situ in said matrices an elastomer phase of approximately tens of nanometers, which will be explained below. According to the invention, the second material, after polymerization of the polymerizable mixture, forms elastomer block A-rich areas dispersed within first thermoset material, said elastomer areas being of less than 80 nanometers in size, preferably of less than 50 nanometers, more preferably of less than 20 nm. It is sometimes even possible to have sizes that are equal to or lower than 10 nm.

As used herein, the "area size" does refer to its largest size. Where the area is spherical, it does refer to the diameter of the area. Where the area has a needle shape, it does refer to the length of the area.

The block B is preferably compatible with the first thermoset material (the matrix) and also preferably, the block A is not compatible with the first thermoset material. A block B is said to be "compatible" with the first thermoset material, as opposed to a block A that is "not compatible" with said first thermoset material, when the block B has an affinity for the thermosetting polymerizable composition, enabling, once polymerization of the polymerizable mixture has been achieved, to obtain a nanostructuration of the blocks A of the second material within the matrix formed by the first thermoset material. The compatible block B or "stabilizing block" role is to stabilize in the matrix the areas of blocks A, or "nanostructuring blocks", during curing. A compatible block B enables a block copolymer comprising blocks A and B and containing said compatible block B in a suitable molar amount, to produce an article that is free from any phase macroseparation, more precisely a block copolymer dispersed within the matrix.

The block B is generally soluble in the thermosetting polymerizable composition. A second material exclusively consisting in the compatible polymer block B would not generate during the polymerization reaction any phase macroseparation. On the contrary, a second material exclusively consisting in the not compatible polymer block A, even if it is initially soluble in the thermosetting polymerizable composition, would generate during the polymerization reaction a phase macroseparation resulting in an opaque cross-linked article. The compatible or not compatible nature of a block does not depend on the solubility of said block or of that of the block copolymer comprising said block in the initial thermosetting polymerizable composition.

More precisely, for the article to be transparent, its matrix formed of the first thermoset material must be nanostructured through block A-rich areas with a size of the order of some nanometers. If the sizes of said areas are too high, the article becomes non transparent or even opaque. According to the invention, block A-rich areas have sizes of less than 80 nanometers, preferably of less than 50 nanometers, so as to avoid a non transparency of said article. It is then said to be a phase microseparation phenomenon, as opposed to the phase macroseparation phenomenon, wherein the elastomer areas have sizes of more than 80 nanometers. The fact that a block is compatible with the first thermoset material depends on various parameters, especially on the temperature at which the polymerization reaction occurs and on the weight percentage of the second material in the polymerizable mixture.

The second material of the invention represents generally up to 50% by weight of the polymerizable mixture, so as not to interfere with the transparency of the final material. More preferably, it represents from 5 to 15% by weight of the polymerizable mixture. It preferably comprises only one block copolymer. Generally, the block copolymers of the invention have a number average molecular weight varying from 1000 to 500000 g/mol, preferably from 10000 to 500000 g/mol, more preferably from 20000 to 200000 g/mol. Each block may be attached to the other either directly, by means of a covalent bond, or by means of an intermediate molecule that does not form an integral part with the block, attached to one of the blocks by a covalent bond and to the other block by another covalent bond. However, the junction of the blocks is not necessarily linear but may be radial, in the case of a graft polymer which blocks do form the side chains (teleblocks). The blocks may be stereoblocks. The block copolymers used in the present invention may include blocks with various tacticities. They may comprise atactic, isotactic or syndiotactic blocks, and mixtures thereof. Preferably, said blocks are attached in a linear way.

Block A of the block copolymer of the invention is an elastomer block. As used herein, an "elastomer" does traditionally refer to a synthetic polymer having the properties of the natural rubber (polyisoprene), such as a high extensibility and a high elastic recovery. The elastomer block may be thermoplastic or cross-linked in nature (for example, using a usual curing method). Non limitative examples of elastomer compounds to be used in the present invention include polyisoprene, polybutadiene, polyisobutylene, some polyurethanes and polyacrylates, their copolymers, and copolymers such as butadiene and acrylonitrile copolymers. As used herein, a "copolymer" does refer to any copolymer, either random, alternating, with blocks or graft. The block A may comprise several segments formed by these elastomer compounds. Preferably, the block A is a thermoplastic elastomer block. Non limitative examples of thermoplastic elastomer compounds to be used include ionomers such as those described in U.S. Publication No. 20040209707, some polyurethanes, poly(meth)acrylates or polyesters, or block copolymers such as SBS or poly(styrene-butadiene-styrene), polyether-ester block copolymers such as Hytrel®, comprising polybutylene terephthalate rigid blocks and polytetramethylene ether terephthalate flexible blocks, polypropylene type block copolymers comprising atactic and isotactic blocks, but also Sarlink®, Vyram®, Dytron® and Vistaflex®.

The block A is preferably a block homopolymer or copolymer comprising at least one monomer unit, said monomer unit being selected from 2-methoxyethyl(meth)acrylate, alkyl(meth)acrylates such as butyl(meth)acrylate, methyl acrylate, ethyl(meth)acrylate, 2-ethylhexyl(meth)acrylate, benzyl(meth)acrylate, 2-phenoxyethyl(meth)acrylate, 2-hydroxyethyl acrylate, a diene such as isoprene, butadiene, isobutylene, 2,3-dimethyl-1,3-butadiene, 1,3-pentadiene, 2-phenyl-1,3 butadiene.

The block A is advantageously selected from poly(dienes), especially poly(butadiene), poly(isoprene) and their random copolymers or from poly(dienes) partially or totally hydrogenated.

Amongst the polybutadienes, those are advantageously used which Tg (glass transition temperature) is the lowest, for example polybutadiene-1,4 which Tg (about −90° C.) is lower than that of the polybutadiene-1,2 (about 0° C.).

The blocks A may also be hydrogenated. This hydrogenation is effected according to traditional methods.

More preferably, said monomer unit is selected from 2-methoxyethyl acrylate (MEA), butyl acrylate (BA), methyl acrylate (MA), benzyl acrylate (BnA) and 2-phenoxyethyl acrylate (PEA). As used herein, a "monomer unit" does refer to a group of atoms produced by only one monomer molecule in the structure of a polymer or an oligomer. Low Tg elastomer compounds being known for having impact reinforcement properties, the block A glass transition temperature is preferably lower than or equal to 20° C., more preferably lower than or equal to 0° C. and even more preferably, lower than or equal to −20° C. Thus, amongst blocks A to be suitably used in the present invention, methyl polyacrylate has a Tg≈5° C., ethyl polyacrylate has a Tg≈−24° C., butyl polyacrylate has a Tg≈54° C., 2-ethylhexyl polyacrylate has a Tg≈−85° C., 2-ethylhexyl polymethacrylate has a Tg≈−10° C., benzyl polyacrylate has a Tg≈6° C., 2-phenoxyethyl polyacrylate has a Tg≈−3° C., 2-hydroxyethyl acrylate has a Tg≈−15° C.

The block B of the block copolymer of the invention is hydrophilic, that is to say, in the context of the present invention, that it is able to absorb an amount of water of at least 2% of its weight, preferably at least 4% of its weight and more preferably at least 8% of its weight. An optimal hydrophily range does vary from 3 to 15% of its weight.

The block B is preferably a block homopolymer formed from a water-soluble monomer or a block copolymer comprising at least one water-soluble monomer unit. Preferably, the block B of the block copolymer of the invention is a thermoplastic block, more preferably a thermoplastic copolymer. Blocks A and B should be selected so that the second polymer material comprising at least one block copolymer containing at least the two polymer blocks A and B as previously defined satisfies to at least two conditions, namely be initially soluble in the thermosetting polymerizable composition of the invention and, after polymerization of the polymerizable mixture of the invention, form elastomer block A-rich areas dispersed within the first material, the area sizes being of less than 80 nanometers, preferably of less than 50 nanometers.

As previously stated, the block B has an affinity for the thermosetting polymerizable composition, thus enabling, at the end of the polymerizable mixture polymerization process for a nanostructuration of the blocks A in the second material within the matrix consisting in the first thermoset material. The role of the compatible block B or "stabilizing block" is to stabilize in the matrix the block A, areas, or "nanostructuring blocks", during curing.

Preferably, the block B is a block homopolymer formed from a water-soluble monomer or a block copolymer (random, alternating, with blocks or graft copolymer) comprising at least one water-soluble monomer unit. Such block copolymers are generally selected so as to be water-soluble. These hydrophily and water-solubility characteristics have a positive influence on the second material solubility in the thermosetting polymerizable composition of the invention during all the curing reaction, upon which a non-phase macroseparation is formed. In other words, the presence in the block B of water-soluble, high polarity monomer units in a certain amount makes this block compatible with the first thermoset material. Where the compatible block B is a copolymer comprising monomer units chemically different in nature, at least one of them must assume the compatibility with the first thermoset material. It is a water-soluble monomer unit. Such units are called "compatible monomer units". For this type of copolymers, there is a molar percentage of compatible monomer unit said to be crucial, above which the block is converted from a not compatible block to a compatible block. It should be noted that depending on the type of block A used, the initial miscibility of the block copolymer in the polymerizable mixture may change. If the block A is initially miscible in the polymerizable mixture, a micro-phase separation phenomenon can be observed during polymerization (elastomer areas having sizes of less than 80 nm appear during the reaction). If the block A is initially immiscible in the polymerizable mixture, small-sized areas are already present in the polymerizable mixture prior to beginning the polymerization and they are stabilized through the blocks B during the reaction.

Non limitative examples of water-soluble monomer units to be used in the present invention include (meth)acrylamide units, low molecular weight N-alkyl-(meth)acrylamide units which N-alkyl group is substituted with a hydroxyl group, such as N-hydroxyethyl acrylamide, ethylene oxide, 2-acrylamido-2-methyl propanesulfonic acid, N-vinylpyrrolidin-2-one, N-vinylpyrrole, 2-vinyloxazoline, 2- and 4-vinylpyridine, 2-vinyl-4,4'-dialkyloxazolin-5-one, sodium styrene sulfonate, sodium vinyl sulfonate, allyl alcohol, 3-trimethylammonium-2-hydroxypropyl-(meth)acrylate chloride, 2-aminoethyl(meth)acrylate, dimethylaminoethyl(meth)acrylate, dimethylaminoethyl(meth)acrylamide, optionally quaternized, glycerol(meth)acrylate, N-(1,1-dimethyl-3-oxobutyl)acrylamide, low molecular weight alkyl(meth)acrylate units which alkyl group is substituted with a hydroxyl, amino, N,N-dialkylamino, N-alkylamino, or (polyalkyl)quaternary ammonium group, such as 2-hydroxyethyl methacrylate or 4-hydroxybutyl acrylate, carboxylic acid units having a total of from 3 to 5 carbon atoms and carrying a vinyl group, such as (meth)acrylic acid, 2-methacryloyloxy-ethyl-phosphoryl choline, tris-(trimethylsiloxysilyl)-propylvinyl carbamate, N,N-dialkyl(meth)acrylamide units such as N,N-dimethyl acrylamide, N-alkyl(meth)acrylamide units and ethoxylated (meth)acrylate such as 2-methoxyethyl(meth)acrylates, alkyl and vinyl ether units which alkyl group is substituted with a hydroxyl or amino group, polyethylene glycol (PEG) (meth)acrylate units, the weight of the polyethylene glycol group varying from 400 g/mol to 10000 g μmol, and polyethylene glycol monomethylether(meth)acrylate units. The hereabove methacrylates or methacrylamides may be respectively replaced with (lower alkyl or lower hydroxyalkyl group)acrylates and (lower alkyl or lower hydroxyalkyl group)acrylamides if the water-solubility of the latters is sufficient to give to the block copolymer of the invention the expected properties. The block B may be a block copolymer comprising a mixture of these monomer units.

Preferably, the block B selected from the block homopolymers poly(N,N-dimethyl acrylamide), poly(N-vinylpyrrolidin-2-one), poly(ethylene oxide), the block copolymers comprising N,N-dimethyl acrylamide (DMA) monomer units, the block copolymers comprising N-vinylpyrrolidin-2-one (NVP) monomer units, the block copolymers comprising ethylene oxide monomer units and the block copolymers comprising mixtures of these monomer units. DMA, NVP and ethylene oxide monomer units represent indeed the best monomer units compatible with the first thermoset material. Where the block B is a block copolymer which comprises a molar percentage of water-soluble monomer units of less than 100%, the rest to 100% preferably corresponds to monomer units such as alkyl(meth)acrylate units. Thus, according to a preferred embodiment, the block B is selected from poly(N,N-dimethyl acrylamide) (PDMA) block homopolymers, poly(N-vinylpyrrolidin-2-one) block homopolymers, poly(ethylene oxide) block homopolymers, poly(N,N-dimethyl acrylamide-co-methyl methacrylate) block copolymers, poly(N-vinylpyrrolidin-2-one-co-methyl methacrylate) block copolymers and poly(ethylene oxide-co-methyl methacrylate) block copolymers. The amount of water-soluble monomer units in the block B, but also the relative molecular weights of blocks B and A play a major role in the block copolymer structuration evolution in the poly(thio)urethane formulation during polymerization, and hence strongly influence the final structure of the material.

The particularly preferred block B is a copolymer of methyl methacrylate (MMA) and water-soluble monomer.

The amount of MMA may be of from 10 to 95 mol. % for along with 90 to 5% of water-soluble monomer.

Preferably, at least 40 mol. % of the monomer units of the block copolymers B are water-soluble monomer units, that are preferably selected from N,N-dimethyl acrylamide monomer units, N-vinylpyrrolidin-2-one monomer units, ethylene oxide monomer units and mixtures thereof. This percentage does correspond to the crucial percentage as previously mentioned.

Using a block B the glass transition temperature (Tg) of which is higher than or equal to that of the first thermoset polymer material is particularly advantageous. It will result as a consequence a high Tg transparent article. The higher the Tg, the better the material thermomechanical properties. Using a block B solubilized in polythiols and/or polyols, preferably polythiols, of the thermosetting polymerizable composition is particularly advantageous at a temperature that can be used during the polymerization step. This solubility characteristic has a positive influence on the non-phase macroseparation during the polymerization reaction. A high amount of water-soluble monomer units in the block B enhances the solubility in the polythiols.

The weight percentage of B in the block copolymer of the invention preferably varies from 5 to 95% and more preferably from 15 to 85%.

The block copolymer of the invention is preferably of the AB or BAB type. As used herein, a "block copolymer of BAB type" does not only refer to copolymers, wherein the type B blocks of each of both ends are the same, but also to copolymers, wherein the type B blocks at each of both ends are different, either due to their weight or due to the nature and the chaining of their monomer units. The block copolymers that are preferred according to the invention are the BAB block copolymers, wherein A represents a 2-methoxyethyl polyacrylate (PMEA) block, B represents a poly(N,N-dimethyl acrylamide-co-methyl methacrylate) block comprising a molar percentage of N,N-dimethyl acrylamide monomer units of 58% and a molar percentage of methyl methacrylate (MMA) monomer units of 42%. Preferably, the molar amount of block A as compared to the BAB block copolymer above is of less than 32%. Amongst the poly[(DMA-co-MMA)-b-MEA-b-(DMA-co-MMA)] block copolymers above, the particularly preferred one according to the invention is marketed under the trade name DC 58 by Arkema. Its stabilizing block B is hence a random copolymer formed of methyl methacrylate entities (42 mol. %) and of N,N-dimethyl acrylamide entities in a high percentage (58 mol. %). It comprises 31.1% of PMEA block A and 68.9% of poly(DMA-co-MMA) block B, these molar amounts having been determined by NMR.

The block copolymer of the invention may also be a BAC or ACB triblock copolymer, wherein A and B are such as previously defined and block C is a PMMA homopolymer or a polymer based on vinyl monomers or vinyl monomer mixtures.

Suitable examples of blocks C include those derived from vinyl aromatic compounds such as styrene, α-methyl styrene, vinyl-toluenes, and those derived from alkyl esters of acrylic and/or methacrylic acids having from 1 to 18 carbon atoms in the alkyl chain. The BAC triblock has a number average molecular weight that may range from 1000 to 500000 g/mol, preferably from 10000 g/mol to 500000 g/mol, and more preferably from 20000 to 200000 g/mol.

Advantageously, the BAC triblock has following composition as expressed in weight concentration, the total being 100%:

B+C: from 10 to 80%, preferably from 15 to 70%.
A: from 90 to 20%, and preferably from 85 to 30%.

The block copolymers of the present invention may be prepared by anionic polymerization, for example depending on the methods described in the European patent applications EP 524054 and EP 749987.

B may be prepared by any polymerization method and especially by controlled radical polymerization. The controlled radical polymerization is well known. Usual radical polymerizations do not enable for the production of architecturally controlled polymers and copolymers, especially due to the short life-time of the radicals, due to their high reactivity and because of the lack in stereochemistry of the intermediate species. As used herein, a "controlled radical polymerization" does refer to a usual radical polymerization, wherein a control is conducted of at least one of the following steps chosen from initiation, propagation, termination and transfer. As a control example, the reversible deactivation of the developing macroradicals may be mentioned. This reversible deactivation may be caused by the addition of nitroxides in the reaction medium. A persistent nitroxide radical is for example TEMPO (2,2,6,6-tetramethyl-1-piperidinyloxy) that does capture macroradicals and generally results in homopolymers having very narrow polymolecularities, thus providing to the radical polymerization some "living" character. Also included are the beta-phosphorylated molecules and those having a hydrogen attached to an alpha carbon of the nitroxide function.

The present invention further relates to a transparent article having an improved toughness prepared by polymerizing a polymerizable mixture according to the invention, preferably a transparent molded article, in "poly(thio)urethane glass" as called herein. Said article comprises an alloy of a first thermoset polymer material that is the matrix of said article (alloy main phase), and of a second polymer material dispersed within said first cross-linked material. According to the invention, the second polymer material does form elastomer block A-rich areas dispersed within the first material, the area sizes being of less than 80 nanometers, preferably of less than 50 nanometers.

The second polymer material modifies the mechanical properties and/or the optical properties of the poly(thio)urethane matrix, that does advantageously have simultaneously the properties from each of both block types. Thus, the storage modulus E' at 100° C. and the glass transition temperature of the article of the invention are preferably higher than those of the first thermoset polymer material. The storage modulus E' is measured using a Rheometrics Solid Analyser RSAII apparatus, traditionally used for characterizing the mechanical dynamic properties of a viscoelastic material. The apparatus is used in a traction mode. A dynamic sinusoidal strain of low amplitude (we are still in the linear elastic area of the material) is applied onto the sample. This test determines the (elastic energy) storage modulus E', as well as the (viscous) E" loss modulus. E' enables for the determination of the material deformability under the effect of an applied force. In the present invention, E' is measured at 100° C., a temperature reached at various production steps of glass and during optional subsequent treatments, such as for example colouring and lacquering steps. Incorporating the block copolymer of the invention in a suitable amount, especially BAB type block copolymers, at least 40 mol. % of the monomer units of the block copolymers B of which are selected from DMA, NVP or ethylene oxide monomer units, and mixtures thereof, makes it possible to obtain a storage modulus E' at 100° C. ranging from 30 to 300 MPa, preferably from 35 to 200 MPa.

Moreover, the stress intensity critical factor $K_{Ic}$ of the article of the invention is higher than that of the first thermoset polymer material. The stress intensity critical factor $K_{Ic}$, expressed in $MPa \cdot m^{1/2}$, is a measure of the breaking strength of a crack-containing material. It has been determined by a tensile strength test on normalized fatigue pre-cracked specimens, according to the ASTM E399 or ASTM E 1820 standard.

The invention also relates to an optical article comprising a substrate in organic glass, which substrate in organic glass is a transparent article according to the invention. Said optical article is particularly adapted for making an ophthalmic lens. This article may be a finished glass, that is to say a glass both optical surfaces of which have the expected geometry at the end of the molding, or a semi-finished glass, that is to say a glass, one face of which already has its final geometry and one face of which must undergo a surface working until it has its final geometry, as well as smooth grinding and polishing operations by means of suitable tools. The articles obtained according to the invention are transparent and have an improved toughness ($K_{Ic}$), from which results better impact and crack propagation resistances. The poly(thio)urethane material of the invention is hence particularly adapted to drilled spectacles, as it makes it possible to limit or even avoid this crack propagation, both during the drilling operation and during the spectacle frame subsequent wearing.

For improving some properties of such optical articles, for example ophthalmic lenses which substrate is in organic glass, such as, amongst others, the impact resistance, the abrasion and scratch resistance, the antireflective character and the fouling resistance, it is possible to apply on at least one of their main faces one or more functional coatings. A major drawback of organic glasses, less hard than mineral glasses, is their poor scratch resistance. It is thus an absolutely common practice to successively form on a substrate main face a first coating, called impact-resistant primer, the aim of which being to increase the impact resistance of the article and the adherence of subsequent coatings to the substrate as well, and then on this impact-resistant primer coating, a hard coating, generally called anti-abrasion coating or anti-scratch coating, the aim of which consists in improving the ability of the optical article surface to resist to damages caused by mechanical aggressions. An anti-reflection coating is being stacked onto the anti-abrasion coating, then in turn an anti-fouling coating, the aim of which being to change the interface tension between the anti-reflection layer and water or grease (so as to reduce their adherence), but also in filling the voids so as to prevent grease from entering and remaining there.

The invention lastly relates to a method for making a transparent article such as previously defined. The method of the invention comprises at least five steps. The first one consists in solubilizing the second material comprising at least one block copolymer in the polythiols and/or polyols, preferably the polythiols, by optionally heating and stirring. The block copolymers are preferably used in the form of a powder or granules. The second step consists in adding polyiso(thio)cyanates, optionally under heating, to the thus obtained homogenous solution and in homogenizing the resulting polymerizable mixture. Preferably, a degassing step of the solution obtained at the first step is effected prior to the second step, optionally under vacuum and under heating. At the end of the degassing, a demixing may appear, that forms two phases, amongst which one is rich in block copolymers, the other one rich in polythiol and/or polyol. This degassing step is relatively important. Indeed, the block copolymers containing water-soluble monomer units are hygroscopic in nature. PDMA itself is a very hygroscopic homopolymer containing many percent of water in the powdered state. The iso(thio)cyanate functions being reactive against water, solubilizing block copolymers having a high number of water-soluble monomer units in the polyiso(thio)cyanates leads to a hydrolysis of some iso(thio)cyanate functions through the water contained in the powdered block copolymer (solubilizing the powdered block copolymer in the polyiso(thio)cyanates may last for ½ hour at 80° C.). Problems as regards bubble formation during the polymerization and the stoichiometry between SH and NCO functions arise therefore. The best way to prepare the formulation is to solubilize the block copolymer in the polythiols and/or polyols, preferably the polythiols, and in degassing this binary mixture prior to introducing the polyiso(thio)cyanates. Adding the polyiso(thio)cyanates in step 2 re-homogenizes generally the solution. At the end of this phase, the polymerizable mixture may be cooled to room temperature. During step 3 (cast molding), a mold is filled with this optionally cooled and optionally filtered polymerizable mixture. The mold itself may be at the room temperature, or be previously heated in the oven wherein the polymerization will occur. For block copolymer contents of less than or equal to 10% by weight in the polymerizable mixture, it is possible to cast the solution when it is at room temperature (15-25° C.). For contents of more than 10% by weight, it is recommended to pre-heat the solution. Generally, a temperature of about 90° C. is perfectly adapted. In step 4, the polymerizable mixture is polymerized, preferably by heating the same in a oven at a temperature ranging from 80 to 140° C., more preferably from 110 to 130° C., until the transparent article is obtained. While a simple thermal activation is sufficient, the polymerization reaction may be activated using any other suitable means. Lastly, the mold removal is effected and the molded transparent article is recovered.

Following examples illustrate the polymerizable mixtures, the transparent articles and the method of the invention, without any limitation.

EXAMPLES

In the following examples, the thermosetting polymerizable compositions are polythiourethane formulations noted "formulations A", comprising a mixture of polythiol of formula (II) and xylylene diisocyanate (SH/NCO stoichiometric ratio=1). The "second material" used in the examples is the block copolymer DC 58 from Arkema. The poly(N,N-dimethyl acrylamide) used in the preliminary experiments was provided by Scientific Polymer Products. Its characteristics are as follows: Tg=120° C., $M_w$=100 000 g·mol$^{-1}$ (determined by steric exclusion chromatography in water by using polyethylene oxide standards).

Firstly, a certain number of experiments supporting the teachings given in the hereabove description will be described.

Thermoplastic and Elastomer Blocks Compatibility Analysis

After having solubilized various thermoplastic polymers and/or elastomers having a molecular weight $M_n$ of about 30 000 g/mol in a thermosetting formulation A, the polymerization was effected at 120° C. until completion (3 hours). The polymers were solubilized in an amount of 5% and 15% by weight, as compared to the polymerizable mixture total weight. The increase in the molecular weight of the developing polythiourethane chains may induce a phase macroseparation during polymerization, hence thermoplastic and/or elastomer-rich phases dispersed in the thermoset matrix. The same behaviors were observed for both polymer contents of 5 and 15%.

a. Analyzing the Behavior of Non Compatible-Type Blocks

The behaviors of the methyl poly(meth)acrylate (PMMA), 2-phenoxyethyl poly(meth)acrylate, benzyl poly(meth)acrylate and phenyl poly(meth)acrylate homopolymers as regards their miscibility were evaluated. In the polythiol of formula (II), these behaviors do vary between total immiscibility and a partial miscibility only at high temperature. The whole group of block homopolymers is initially miscible at any temperature higher than the room temperature in the thermosetting polymerizable compositions comprising a mixture of the polythiol of formula (II) and xylylene diisocyanate (formulation A). However, the polymerization of the thus formed polymerizable mixtures does induce a phase macroseparation during the reaction and provides a final material that is fully opaque. For this reason, the 8 blocks previously mentioned are all blocks that are not compatible with the first thermoset material as defined in the context of the present invention.

Figure 1:
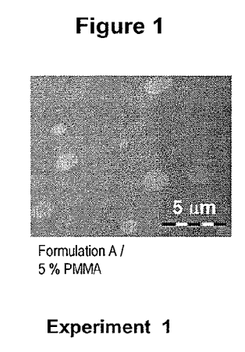
FIGS. 1 to 4 show observation photos made by transmission electron microscopy (TEM, natural contrast) of polythiourethane glass samples prepared by polymerizing at 120° C. during preliminary experiments aiming at studying the behavior within a polythiourethane matrix, of individual "blocks" of (co)polymers (scale: the whole line (black and white) represents 5 µm), and not of block copolymers.

The experiment 1 corresponds to a polymerizable mixture comprising 5% by weight of PMMA, as related to the weight of said mixture. FIG. 1, associated with experiment 1, illustrates the final morphology of the system. The phase macroseparation produces thermoplastic particles dispersed in the thermoset matrix of the micrometer order size.

b. Analyzing the Behavior of Compatible Type B Blocks

The poly(N,N-dimethyl acrylamide) (PDMA) and polyethylene oxide (POE) water-soluble homopolymers having a molecular weight of less than 10000 g/mol are fully miscible in the polythiol of formula (II), in the xylylene diisocyanate and in the formulations A. In addition, they remain fully miscible in such thermosetting polymerizable compositions from the beginning to the end of the polymerization reaction, thus leading to a homogenous structure and to a transparent material. PDMA and POE blocks are hence blocks that are compatible with the first thermoset material.

c. Analyzing the Compatibility of Poly(MMA-co-DMA) Random Block Copolymers (Type B Blocks): Determination of the Crucial Molar Percentage of DMA Monomer Unit The PMMA block homopolymer is not compatible with the first thermoset material, as opposed to the PDMA block that is compatible with the polythiourethane matrix. Six poly (MMA-co-DMA) random copolymers were prepared to study their compatibility with the polythiourethane matrix.

Table 1 does show how a percentage of DMA monomer units in the random copolymer higher than 15% is required to obtain the copolymer miscibility in the polythiol reagent of formula (II). It should be noted that this percentage depends on the block B molecular weight which is here of about 30 000 g/mol (number average molecular weight). Above 15 mol. % of DMA monomer units, the higher the DMA entities percentage in the copolymer, the lower the temperature at which the random copolymer is miscible in the polythiol of formula (II). The mixture behavior is of the UCST type (upper critical solution temperature=high temperature miscibility). Thus, assuming that a copolymer comprises 57% of DMA monomer units, the crucial demixing temperature is of about 80° C. If a copolymer comprises 43% of DMA monomer units, the crucial demixing temperature is of about 135° C. If a copolymer comprises 25% of DMA monomer units, the crucial demixing temperature is of about 180° C. A copolymer comprising less than 15% of DMA monomer units is immiscible in the polythiol of formula (II) for any temperature below 200° C. within a large composition range. Moreover, a molar percentage of DMA monomer units higher than 90% in the random copolymer is required to obtain a miscibility of the copolymer in the polythiol of formula (II) for any temperature higher than 0° C.

TABLE 1

| DMA mol. % in the random copolymer | Miscibility of the random copolymer | | |
|---|---|---|---|
| | Xylylene diisocyanate | Polythiol of formula (II) | TPC |
| 0 (PMMA) | Miscible at T > 20° C. | Immiscible at T < 200° C. | Miscible at T > 20° C. |
| 3.5 | Miscible at T > 20° C. | Immiscible at T < 200° C. | Miscible at T > 20° C. |
| 7.5 | Miscible at T > 20° C. | Immiscible at T < 200° C. | Miscible at T > 20° C. |
| 15 | Miscible at T > 20° C. | Immiscible at T < 200° C. | Miscible at T > 20° C. |

TABLE 1-continued

| DMA mol. % in the random copolymer | Miscibility of the random copolymer | | |
|---|---|---|---|
| | Xylylene diisocyanate | Polythiol of formula (II) | TPC |
| 25 | Miscible at T > 20° C. | Miscible at T > 180° C. | Miscible at T > 20° C. |
| 43 | Miscible at T > 20° C. | Miscible at T > 135° C. | Miscible at T > 20° C. |
| 57 | Miscible at T > 20° C. | Miscible at T > 80° C. | Miscible at T > 20° C. |
| 100 (PDMA) | Miscible at T > 20° C. | Miscible at T > 20° C. | Miscible at T > 20° C. |

TPC: thermosetting polymerizable composition comprising a mixture of polythiol of formula (II) and xylylene diisocyanate with a stoichiometric ratio SH/NCO = 1. The present miscibility is here defined as being the initial miscibility.

Tables 1 and 2 show that the non-miscibility of poly (MMA-co-DMA) random copolymers, in other words of type B blocks, in the polythiol of formula (II) induces a phase macroseparation during the polymerization reaction. The crucial percentage of DMA monomer units in the random copolymer required to obtain a total miscibility of this copolymer in a polythiourethane formulation comprising a mixture of polythiol of formula (II) and of xylylene diisocyanate from the beginning to the end of the polymerization reaction is of 40%, with a polymerization temperature of 120° C. (see Table 2).

TABLE 2

| DMA mol. % in the random copolymer | Phenomenon | Transparency |
|---|---|---|
| 0 (PMMA) | Phase macroseparation | No |
| 3.5 | Phase macroseparation | No |
| 7.5 | Phase macroseparation | No |
| 15 | Phase macroseparation | No |
| 25 | Phase macroseparation | No |
| 43 | Total miscibility | Yes |
| 57 | Total miscibility | Yes |
| 100 (PDMA) | Total miscibility | Yes |

Experiments 2, 3 and 4 correspond to polymerizable mixtures comprising 5% by weight of a poly(DMA-co-MMA) copolymer, as related to the weight of said mixture, said copolymer comprising respectively 7.5%, 15% and 25 mol. % of DMA monomer units.

Figure 2:
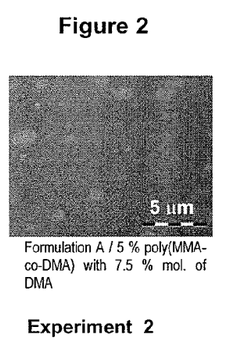
Figure 3:
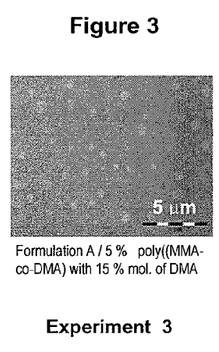
Figure 4:
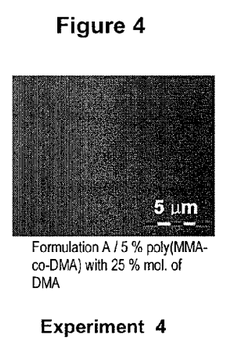

FIGS. 2 to 4, associated with experiments 2 to 4, illustrate the final morphology of systems comprising 5% by weight of a thermoplastic copolymer containing less than 40 mol. % of DMA monomer units. The phase macroseparation induces thermoplastic particles dispersed in the thermoset matrix, the size of which does decrease depending on the amount of DMA monomer units in the random copolymer. By using a copolymer containing 43 mol. % of DMA monomer units, no phase macroseparation is observed: the random copolymer is fully miscible in the polythiourethane matrix until the end of the reaction. These observations were confirmed by thermomechanical data.

Preparation Procedure for Making Transparent Articles of the Invention

The block copolymer DC 58 is introduced in the form of granules in the polythiol of formula (II), then heated to 130° C. under stirring until a total solubilization is reached and a transparent solution is obtained. This is degassed under vacuum for 0.5 hour at 110° C., thus producing a demixing. Two phases appear, amongst which the first one is rich in DC 58, and the second one is rich in trithiol of formula (II). A stoichiometric amount of xylylene diisocyanate is added to this mixture according to a molar ratio NCO/SH=1 at 110° C.

The mixture is maintained at 110° C., and then becomes homogenous again. It is stirred for 5 minutes at 80° C., then cooled at 20° C. The solution, at 20° C. (for block copolymer concentrations lower than or equal to 10% by weight as compared to the polymerizable mixture total weight) or preheated (for block copolymer concentrations higher than 10% by weight as compared to the polymerizable mixture total weight), is then poured into a mold, itself at room temperature, or previously heated in the oven wherein the polymerization will proceed. Lastly, the polymerizable mixture is polymerized at 120° C. for four hours in an oven.

In example 1, the polymerizable mixture comprises the formulation A and 5% by weight of DC 58 from Arkema, as compared to the polymerizable mixture total weight. In example 2, the polymerizable mixture comprises the formulation A and 15% by weight of DC 58 from Arkema, as compared to the polymerizable mixture total weight. In the comparative example C1, the polymerizable mixture only comprises the formulation A (pure matrix).

It should be noted that the BAB type block copolymer DC 58, amounting to 5 and 15% by weight, is fully miscible in the xylylene diisocyanate and fully miscible in the polythiol of formula (II) at any temperature higher than 120° C. The DMA monomer unit concentration in the block B, but also the relative molecular weights of blocks B and A play an essential role for the block copolymer miscibility in the polythiol of formula (II).

Improvement of the Crack Propagation Resistance and Tg Properties

Table 3 illustrates the interest of the invention. It shows firstly that incorporating into a polythiourethane matrix a block copolymer of the invention improves the crack propagation resistance properties of said matrix, as evaluated by the stress intensity critical factor $K_{Ic}$. This improvement does not affect the glass transition temperature of the material (Tg), on the contrary. The increase in the toughness is indeed associated with an increase in Tg, as determined by differential scanning calorimetry (DSC), which results from the higher Tg of the block B as compared to that of the thermoset matrix. These two improvements are especially important since the block copolymer DC 58 content is high.

Increase in the Storage Modulus E' at 100° C.

Table 3 shows that the increase in Tg also induces an increase in the E' modulus at 100° C. as compared to a pure matrix (C1), which is another advantage of the transparent articles of the invention.

TABLE 3

| Example | $K_{Ic}$ (MPa · m$^{1/2}$) | E' at 100° C. (MPa) | Tg (° C.) |
|---|---|---|---|
| C1 (pure matrix) | 0.91 | 21 | 83 |
| 1 | 1.18 ± 0.18 | | 86 |
| 2 | 1.35 ± 0.11 | 38 | 92 |

Morphology

Figure 5:
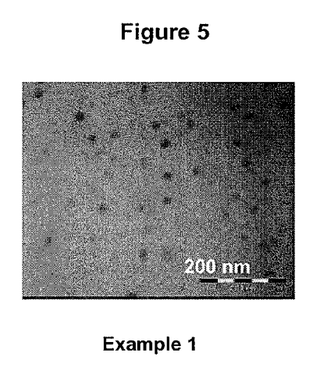
FIGS. 5 and 6 show observation photos made by transmission electron microscopy (TEM) of polythiourethane glass samples prepared by polymerizing at 120° C. respectively in the examples 1 and 2 (scale: the whole line (black and white) represents 200 nm), after labelling for 15 minutes with ruthenium tetraoxide.
Figure 6:
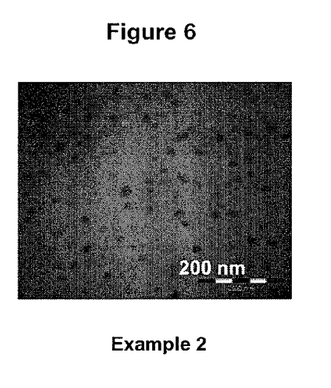

FIGS. 5 and 6 show that polymerizing polymerizable mixtures of the invention, comprising respectively 5 and 15% by weight of a BAB type triblock copolymer of the invention leads to the formation of elastomer areas in the final material, which can be observed by transmission electron microscopy. These areas present in the polythiourethane matrix are small sized (of about 20 nm), and correspond to particles rich in PMEA block A (confirmed by thermomechanical analysis), stabilized through the blocks B formed of random copolymers of MMA and DMA monomer units fully miscible in the matrix.

The invention claimed is:

1. A liquid polymerizable mixture comprising:
   a thermosetting polymerizable composition, which is the precursor, by polymerization, of a first thermoset polymer material, wherein the thermosetting polymerizable composition comprises at least one polythiol and/or at least one polyol, and at least one polyiso(thio)cyanate; and
   a second polymer material solubilized in said thermosetting polymerizable composition, wherein:
      the second material comprises at least one block copolymer comprising at least two polymer blocks, A and B, said block A being an elastomer block and said block B being able to absorb an amount of water of at least 2% of its weight, wherein:
         the block A is a block homopolymer or copolymer comprising at least one monomer unit further defined as 2-methoxyethyl acrylate, butyl acrylate, methyl acrylate, benzyl acrylate, or 2-phenoxyethyl acrylate, and
         the block B is a poly(N,N-dimethyl acrylamide) block homopolymer, poly(N-vinylpyrrolidin-2-one) block homopolymer, poly(ethylene oxide) block homopolymer, block copolymer comprising a N,N-dimethyl acrylamide monomer unit, block copolymer comprising a N-vinylpyrrolidin-2-one monomer unit, block copolymer comprising an ethylene oxide monomer unit, or block copolymer comprising a mixture of at least two of N,N-dimethyl acrylamide, N-vinylpyrrolidin-2-one, or ethylene oxide monomer units;
      the second material forms, after polymerization at a temperature ranging from 80 to 140° C. of the polymerizable mixture, elastomer block A-rich areas dispersed within the first material, wherein the largest area size is less than 80 nanometers; and
      the second material represents from 5 to 50% by weight of the polymerizable mixture.

2. The polymerizable mixture of claim 1, wherein the thermosetting polymerizable composition comprises at least one polythiol.

3. The polymerizable mixture of claim 1, wherein the largest size of the block A-rich areas is less than less than 50 nanometers.

4. The polymerizable mixture of claim 1, wherein the block B is able to absorb an amount of water of 3 to 15% of its weight.

5. The polymerizable mixture of claim 1, wherein the block B is a block homopolymer formed from a water-soluble monomer or a block copolymer comprising at least one water-soluble monomer unit.

6. The polymerizable mixture of claim 1, wherein the block B is a thermoplastic block.

7. The polymerizable mixture of claim 1, wherein at least 40 mol. % of the monomer units of the block copolymers B are water-soluble monomer units that comprise N,N-dimethyl acrylamide monomer units, N-vinylpyrrolidin-2-one monomer units, ethylene oxide monomer units, and/or mixtures thereof.

8. The polymerizable mixture of claim 1, wherein the block A is not compatible with the first thermoset material and the block B is compatible with the first thermoset material.

9. The polymerizable mixture of claim 1, wherein the block A is a thermoplastic elastomer block.

10. The polymerizable mixture of claim 1, wherein the glass transition temperature of the block B is higher than or equal to that of the first thermoset polymer material.

11. The polymerizable mixture of claim 1, wherein the block B is solubilized in the polythiols and/or the polyols of the thermosetting polymerizable composition.

12. The polymerizable mixture of claim 1, wherein the block copolymer is of AB or BAB type.

13. The polymerizable mixture of claim 1, wherein the block copolymer is a BAB block copolymer, wherein A is a 2-methoxyethyl poly(acrylate) block and B is a poly(N,N-dimethyl acrylamide-co-methyl methacrylate) block comprising a molar percentage of N,N-dimethyl acrylamide monomer units of 58% and a molar percentage of methyl methacrylate monomer units of 42%.

14. The polymerizable mixture of claim 13, wherein the molar amount of block A as compared to BAB block copolymer is less than 32%.

15. The polymerizable mixture of claim 1, wherein the block copolymer has a number average molecular weight ranging from 10000 to 500000 g/mol.

16. The polymerizable mixture of claim 1, wherein the thermosetting polymerizable composition is from 70 to 95% by weight of the polymerizable mixture.

17. The polymerizable mixture of claim 1, wherein the polythiol(s) has or have the formula:

$$R^1(SH)_{n1} \quad (I)$$

wherein n1 is an integer ranging from 2 to 6 and $R^1$ is an aliphatic, alicyclic, heterocyclic or aromatic radical, the valence of which is n1.

18. The polymerizable mixture of claim 1, wherein the polythiol(s) is/are further defined as comprising tris(3-mercaptopropionate)pentaerythritol, tetrakis(thioglycolate)pentaerythritol, tris(3-mercaptopropionate)trimethylolpropane, tris(mercaptoacetate)trimethylolpropane, and/or a compound of formulas (II) and (Va):

19. The polymerizable mixture of claim 1, wherein the polyiso(thio)cyanate(s) has or have the formula (VI):

$$R^2(N=C=X)_{n2} \quad (VI)$$

wherein X is an oxygen or a sulphur atom, n2 is an integer ranging from 2 to 6 and $R^2$ is an aliphatic, alicyclic, heterocyclic or aromatic radical, the valence of which corresponds to n2.

20. The polymerizable mixture of claim 1, wherein the polyiso(thio)cyanate(s) comprise tolylene diiso(thio)cyanate, phenylene diiso(thio)cyanate, ethylphenylene diiso(thio)cyanate, isopropylphenylene diiso(thio)cyanate, xylylene diiso(thio)cyanate, diethylphenylene diiso(thio)cyanate, diisopropylphenylene diiso(thio)cyanate, naphtalene diiso(thio)cyanate, isophorone diiso(thio)cyanate, hexamethylene diiso(thio)cyanate, bis(iso(thio)cyanatomethyl)-cyclohexane, trimethylbenzene triiso(thio)cyanate, triiso(thio)cyanato-benzene, (4,4'-diiso(thio)cyanato-diphenyl)-methane, (4,4'-diiso(thio)cyanato-dicyclohexyl)-methane, or a compound of formula (VII), (VIII), (IX), (X), or (XI):

wherein n1 is 0 or 1, n2 is an integer ranging from 2 to 4, n3 is an integer ranging from 1 to 4, the sum of $n2+n3 \leq 6$, n4 is an integer ranging from 1 to 10, X is O or S, Z is O, S, Se, NH, C=O, SO, $SO_2$, $SeO_2$, $CH_2$, —CH=CH— or —$C(R)_2$— with R representing a hydrogen atom or a $C_1$-$C_6$ alkyl radical, $R^1$, $R^2$, $R^4$, $R^5$, $R^6$ independently from each other represent a hydrogen atom or a $C_1$-$C_6$ alkyl radical, $R^3$ is a hydrogen atom, a halogen atom, or a $C_1$-$C_6$ alkyl radical.

21. The polymerizable mixture of claim 1, wherein the thermosetting polymerizable composition comprises at least one polythiol and at least one polyisocyanate.

22. A transparent article having an improved toughness comprising an alloy consisting in a first thermoset polymer material that is the matrix of said article, and in a second polymer material dispersed within said first material, wherein it is prepared by polymerizing a polymerizable composition of claim 1.

23. The transparent article of claim 22, wherein the stress intensity critical factor of said article is higher than that of the first thermoset polymer material.

24. The transparent article of claim 22, wherein the glass transition temperature of said article is higher than that of the first thermoset polymer material.

25. The transparent article of claim 22, wherein the storage modulus at 100° C. of said article is higher than that of the first thermoset polymer material.

26. The liquid polymerizable mixture of claim 1, wherein the second polymer material represents from 5 to 15% by weight of the polymerizable mixture.

* * * * *

UNITED STATES PATENT AND TRADEMARK OFFICE
CERTIFICATE OF CORRECTION

| | | |
|---|---|---|
| PATENT NO. | : 8,299,176 B2 | Page 1 of 1 |
| APPLICATION NO. | : 11/910175 | |
| DATED | : October 30, 2012 | |
| INVENTOR(S) | : Olivier Guerret et al. | |

It is certified that error appears in the above-identified patent and that said Letters Patent is hereby corrected as shown below:

In claim 3, column 24, line 43, delete "less than".

In claim 18, column 25, line 31, delete "tris(3-mercaptopropionate)pentaerythritol, tetrakis(thioglycolate)pentaerythritol" and insert --tris(3-mercaptopropionate) pentaerythritol, tetrakis(thioglycolate) pentaerythritol-- therefor.

In claim 18, column 25, line 32, delete "tris(3-mercaptopropionate)trimethylolpropane" and insert --tris(3-mercaptopropionate) trimethylolpropane-- therefor.

In claim 18, column 25, line 33, delete "tris(mercaptoacetate)trimethylolpropane" and insert --tris(mercaptoacetate) trimethylolpropane-- therefor.

In claim 20, column 25, line 65, delete "bis(iso(thio)cyanatomethyl)" and insert --bis (iso(thio)cyanatomethyl)-- therefor.

In claim 25, column 26, line 62, delete ""°C." and insert --°C-- therefor.

Signed and Sealed this
First Day of January, 2013

David J. Kappos
*Director of the United States Patent and Trademark Office*